United States Patent [19]

Carré et al.

[11] 4,091,619

[45] May 30, 1978

[54] SERVOMOTOR

[75] Inventors: Jean-Jacques Carré, Montreuil; Roland Muterel, Bessancourt, both of France

[73] Assignee: Societe Anonyme D.B.A., Paris, France

[21] Appl. No.: 693,567

[22] Filed: Jun. 7, 1976

[30] Foreign Application Priority Data

Jul. 11, 1975 France .................. 75 21876

[51] Int. Cl.² ........................................... B60T 13/20
[52] U.S. Cl. ..................................... 60/553; 60/554; 60/562; 60/577
[58] Field of Search ............... 60/549, 567, 577, 547, 60/551, 553, 554, 562, 576, 588, 593; 92/8; 91/370, 371, 372, 373

[56] References Cited

U.S. PATENT DOCUMENTS

| 2,590,430 | 3/1952 | Risse | 60/577 |
| 2,875,582 | 3/1959 | Hill | 60/549 |
| 3,062,011 | 11/1962 | Brooks | 60/577 |
| 3,159,975 | 12/1964 | Ayers, Jr. | 60/549 |
| 3,470,695 | 10/1969 | Kilb | 60/549 |
| 3,473,329 | 10/1969 | Eggstein | 60/549 |
| 3,540,219 | 11/1970 | Huruta | 60/577 |
| 3,559,406 | 2/1971 | Gardner | 60/549 |

Primary Examiner—Alan Cohan
Assistant Examiner—Abraham Hershkovitz
Attorney, Agent, or Firm—Leo H. Mc Cormick, Jr.; Ken C. Decker; William N. Antonis

[57] ABSTRACT

The invention relates to a servomotor for assisting the operation of a power brake system. The servomotor includes in a housing a power-assisting part and a part forming a hydraulic master-cylinder. The power-assisting part is adapted in use to be connected to an external power source such as a vacuum source. A valve assembly operated by an operator-operated intake member controls the generation of a pressure differential across a driving piston by allowing air to replace the vacuum on one side of the piston. The master-cylinder part includes an assembly having two coaxial pistons. The first piston is attached to the driving piston of the power assist part whereas the second piston is actuated by the intake member. Both coaxial pistons project into a chamber which is divided by a sealing ring. The central piston is adapted to pass through the sealing ring in response to an input force from the input member to further pressurize the fluid in the outlet portion of the chamber.

6 Claims, 3 Drawing Figures

SERVOMOTOR

BACKGROUND OF THE INVENTION

The invention relates to a servomotor for assisting in the operation, of a motor vehicle brake circuit.

The prior art of which in U.S. Pat. No. 3,109,287 is typical, relates to a servomotor for providing a power assist in the operation of a brake system. The servomotor comprising, in a housing, a power-assisting part and a part forming a hydraulic master cylinder. The power-assisting part being adapted in use to cooperate with an external power source to generate a pressure difference across a driving piston. The pressure difference being controlled by first valve means operated by an intake controlling element. The master-cylinder part comprising a chamber communicating with a fluid replenishing orifice and an outlet orifice. An assembly of two coaxial pistons comprising an annular piston attached to the driving piston and a central piston movable solely by way of the intake controlling element. The first valve means, when actuated from its release or idle position, cause the driving and annular pistons to move in unison. During a first phase of servomotor operation the replenishing orifice is disconnected from the chamber to permit the two coaxial pistons to generate a first pressure level in the chamber.

In devices of this type, when the maximum possible pressure difference is applied to the driving piston, further force transmitted by the operator enables the central piston to be moved towards the interior of the chamber. To increase the pressure at the outlet orifice, however, the operator must overcome a considerable reaction force which acts both on the central piston and on the annular piston, which projects into the chamber and is linked to the central piston by a spring.

SUMMARY OF THE INVENTION

We have devised a servomotor having piston means for dividing the pressurizing chamber of a master cylinder into two compartments. A first compartment adjoins the outlet orifice and a second compartment receives the annular piston. During a second phase of servomotor operation, the central piston is moved out of its idle position for a predetermined travel to increase the pressure level in the first compartment by means of the force exerted by the operator.

This servomotor has two operating phases: during the first phase only the annular piston moves significantly, and the receiving cylinders of the brake actuators can be pre-filled by expelling a relatively large quantity of fluid at medium pressure and during the second phase only the central piston moves and the pressure in the receiving cylinders is considerably increased while still being controlled by the operator. Since the pressure applied when a motor vehicle is braked remains at a medium level on most occasions, the driving piston has a smaller cross-section that in the conventional vacuum brake booster because the operator can use a manual input force to supplement the power assist part in applying the brakes whenever high pressure is necessary.

DETAILED DESCRIPTION OF THE INVENTION

By way of example only, the three servomotors described are brake-assisting servomotors for motor vehicles.

Figure 1:
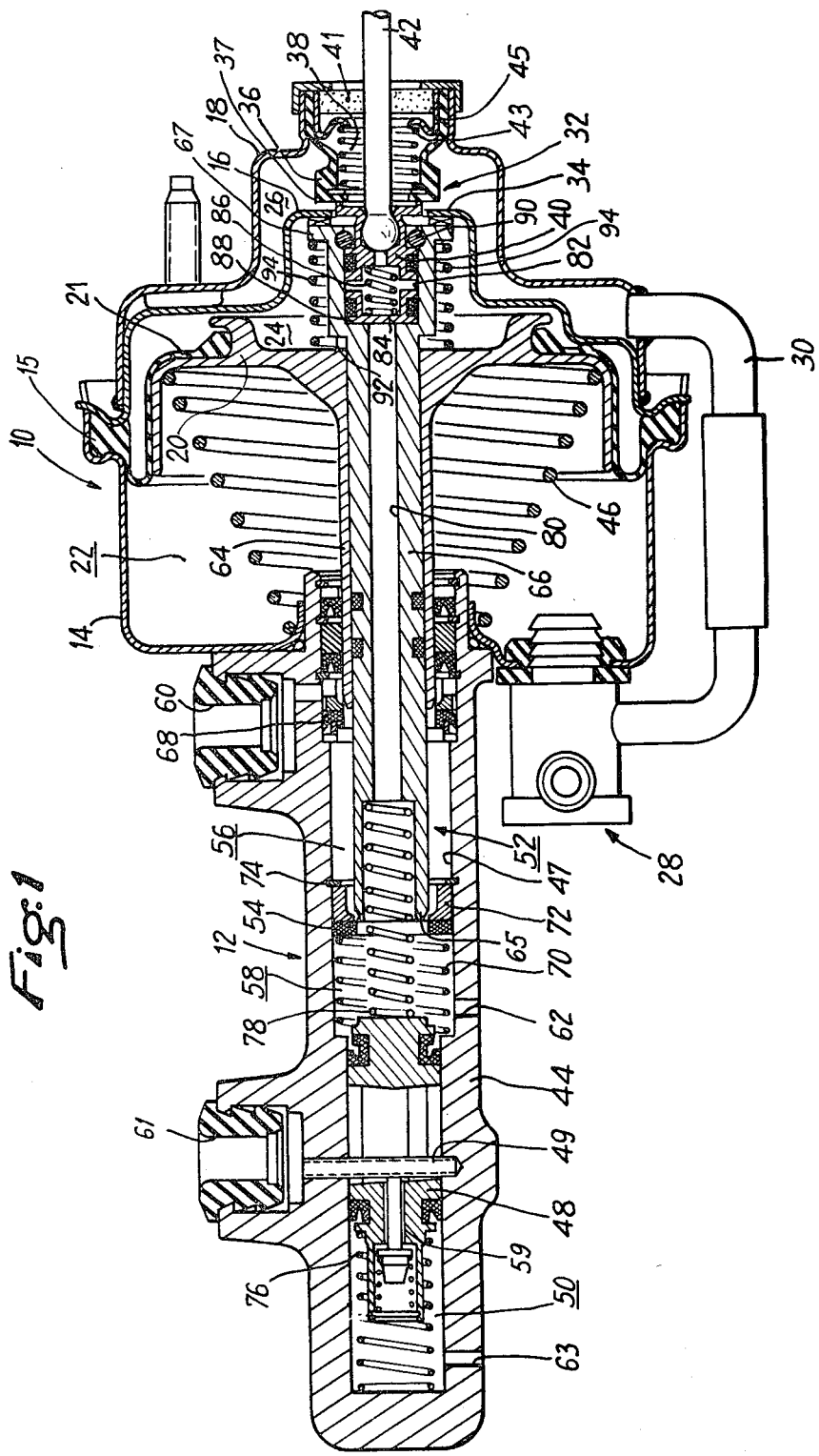
FIG. 1 illustrates a section through a servomotor for assisted operation, embodying the invention.

The brake-assisting servomotor shown in FIG. 1 consists essentially of a power-assisting part 10 and a part 12 forming a master-cylinder. The power-assisting part 10 comprises an assembly of dishes 14, 16 and 18 forming a housing for a driving piston 20. The driving piston 20 has a rubber diaphram 21 of which the outer periphery 15 is held in a fluid-tight manner between the dishes 14, 16. The three dishes 14, 16 and 18 and the piston 20 cooperate to define three chambers 22, 24 and 26. The chamber 22 is permanently connected by a non-return or check valve 28 to the intake manifold of the engine of the motor vehicle fitted with the servomotor. The engine draws air through the intake manifold and creates a vacuum in chamber 22. Chamber 26 is connected by a line 30 to the intake side of the valve 28 so that chambers 24 and 26 communicate freely with each other. The dishes 16, 18 contain central apertures receiving a conventional three-way valve assembly 32. The three-way valve assembly 32 includes a fixed seat 34 on the dish 16, a movable valve member 36 formed by a gaiter, and a movable plunger 40. The periphery of the gaiter is mounted in a fluid-tight manner on the dish 18 and whose interior 38 is connected to the atmosphere by a filter 41. The movable plunger 40, illustrated in FIG. 1 is attached to an intake controlling element such as rod 42 connectible to the operator's brake pedal. The plunger 40 abuts in a fluid-tight manner on the free end of the gaiter 36. A spring 43 which rests on a rigid sleeve 45 fixed to the dish 18 urges face 37 of valve member 36 toward the seat 34. A return spring 46 in chamber 22 urges the driving piston 20 into engagement with dish 16 in the rest position shown in FIG. 1.

The power-assisting part 10 is connected to the hydraulic master-cylinder part 12 as follows. The master-cylinder part 12 comprises a housing 44 containing a bore 47 in which a floating piston 48 defines two pressure chambers 50, 52. Chamber 52 is divided by a sealing ring 54 into compartments 56, 58. Compartment 56 is connectible to a hydraulic fluid replenishing orifice 60 whereas the compartment 58 communicates with an outlet orifice 62 connectible to a set of brake actuators in the vehicle. An assembly of two coaxial and concentric pistons 64 and 66 project into chamber 52. The annular piston 64 is integral with the driving piston 20 whereas the central piston 66 whose external diameter is such that it can slide in a fluid-tight manner in the ring 54. The floating piston 48 is of the conventional type with central replenishing structure and is biased by a spring 76 into its idle position against a stop or rod 49 fixed to the housing 44. In the idle or rest position the outlet orifice 63 of chamber 50 communicates with the replenishing orifice 61 through passage 59 in floating piston 48.

FIG. 1 shows the various components of the servomotor in their idle or rest positions. In this case the free end of the piston 64 which is fixed to the driving piston is clear of a sealing washer 68, so that hydraulic fluid can flow freely between the orifice 60 and the compartment 56. Similarly, the free end 65 of the central piston 66 is clear of the ring 54 and the two compartments 56, 58 communicate freely with each other. The ring 54 is positioned in the bore 47 by a spring 70 urging it against a sleeve 72 which abuts on a circlip 74 fixed to the housing 44. A compression spring 78 is provided between the piston 48 and the central piston 66. The central piston 66 contains a stepped bore of which the portion 82 of largest diameter is near the three-way valve 32. Portion 82 retains a reaction piston 84 capable of cooperating with the plunger 40. Plunger 40 is slidable in the bore portion 82. A spring 86 urges the piston 84 and plunger 40 apart and into abutment respectively with a step or shoulder 88 and a stop ring 90 fixed to the central piston 66. The central piston 66 is connected to the annular piston 64 by a one-way force transmission comprising a shoulder 92 capable of abutting on the driving piston 20. A spring 94 resting on the driving piston 20 urges the central piston 66 to abut in a non-fluid-tight manner on the dish 16.

MODE OF OPERATION OF THE INVENTION

The servomotor 10 shown in FIG. 1 is in the idle position. In the idle position, orifices 62, 63 connect the wheel brake of the vehicle with the fluid replenishing orifices 60, 61. The two compartments 56, 58 now communicate freely. Also the chamber 24 communicates with the chamber 26 (the valve member 36 being off the seat 34) and therefore with the vacuum source delivered by the the vehicle's engine.

When the driver of the vehicle depresses the brake pedal, push rod 42 moves to the left in FIG. 1. This movement of push rod 42 moves the plunger 40 until the valve member 36 abuts on the seat 34 to disconnect chambers 24 and 26, from each other. Disengagement of the plunger 40 from the valve member 36 allows air to enter the chamber 24 from the atmosphere as soon as the plunger 40 has travelled about 2.5 mm or 0.1 inch. With air in chamber 24 and vacuum in chamber 22a pressure difference is now established between the chambers 24 and 22. In this first mode of servomotor operation, the pressure differential urges the piston 64 inwards into the chamber 56 to create a fluid pressure in chambers 56 and 58. While the pressure difference is increasing to vacuum saturation, the annular piston 64 moves accordingly, expelling a considerable quantity of fluid to the outlet orifice 62 and so creating a first, medium pressure level in the three compartments 56, 58 and 50. The pressure rise in the compartment 58 gives rise to a reaction force which acts on reaction piston 84 and to transmit a reaction force to the intake controlling element or push rod 42 by way of the plunger 40.

Thus in the servomotor here described the brake pedal stroke remains very short throughout the first phase of servomotor operation, during which the two compartments 56, 58 continue to communicate. When saturation, that is, the maximum pressure difference offered by the vacuum capacity of the motor, is reached, and the driver wishes to brake his vehicle harder, he depresses the brake pedal more firmly and manually moves the central piston 66 to the left in FIG. 1 so that it passes the sealing ring 54 and disconnects the two compartments 56, 58. This manual input force produces an additional pressure rise in the two chambers 58, 50. When the pedal is released, operation occurs in the reverse manner. However, if for any reason the vacuum source is unable to supply the pressure difference desired, the central piston 66 can move the driving piston 20 through engagement of shoulder 92 on driving piston 20 and manually operate the brakes of the vehicle. Such manual operation is possible due to a non-return valve situated between the compartments 56 and 58 which permits fluid to flow from the chamber 56 to the chamber 58. In this embodiment the non-return valve is the ring 54 associated with the spring 70, which is slidable in the bore 47.

In a variant (not shown) of the embodiment just described, the central piston 66 is attached to the movable plunger 40 of the three-way valve 32, which in turn is attached to the intake push rod 42. This design has the advantage of being cheaper than the previous design, but the disadvantage that the movement of the three-way valve's movable member is sometimes hindered due to the friction caused by relative motion of the central and annular pistons. In the servomotor shown in FIG. 1, however, the reaction piston 84 minimizes friction between the movable plunger 40 and the annular piston 66.

Within the scope of the invention, the sealing ring 54 may be in more than one part.

Figure 2:
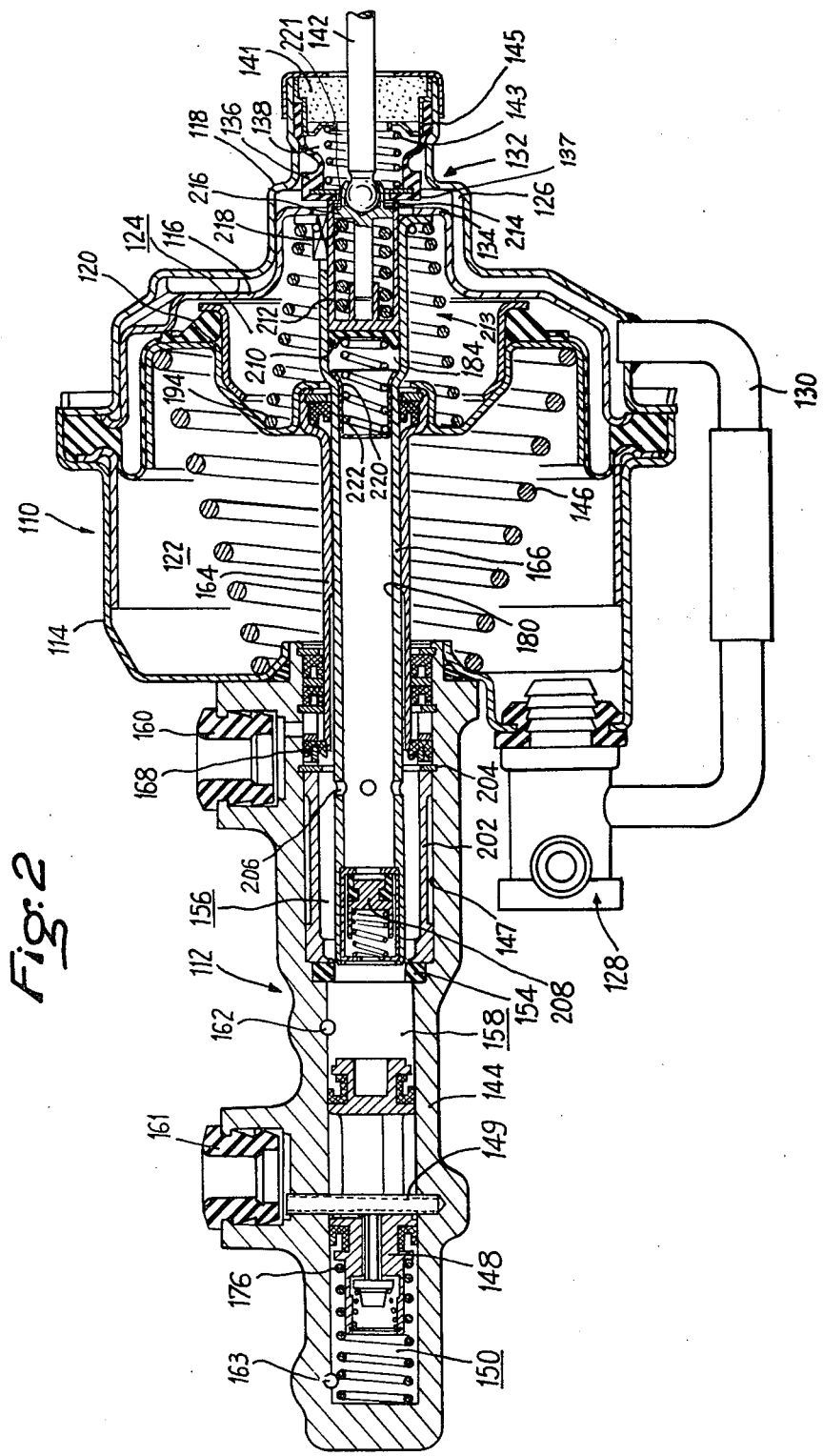
FIG. 2 illustrates another servomotor for assisted operation embodying the invention.

The brake-assisting servomotor shown in FIG. 2 represents a variant of the invention which has many analogies with the device shown in FIG. 1. Consequently elements similar or comparable to those already described with reference to FIG. 1 bear the same reference numeral plus 100 and will not be described in detail. The first difference is that the sealing ring 154 is fixed relative to the housing 144 and is held in position by a sleeve 202 bearing on a circlip 204 attached to the housing 144. The central piston 166 contains ports 206 for connecting the bore 180 to the chamber 156, 158. Another essential difference relates to the operation and design of the three-way valve 132. Whereas the seat 134 and the first movable valve member 136 are unchanged, the second movable plunger 214 is operated by way of the intake control or push rod 142, is attached to the reaction piston 213. The reaction piston is formed of a hollow disc 210 of elastomeric material sliding in a portion 184 of the bore 180 and of a sleeve 212 which slides in the bore portion 184. The free end 214 of sleeve 212 acts on free end 137 of the second movable valve member of the three-way valve to establish an atmospheric seal for the servomotor. A disc 216, which is fixed to the rod 142 slides on the inside of sleeve 212, and bears one end of a compression spring 218 whose other end abuts on the bottom of the sleeve 212. The disc 216 is stopped or retained in sleeve 212 by a circlip 221 fixed to the sleeve 212. A rigid funnel member 220 retains a return spring 222 in the bore 180. This return spring 222 biases the elastomer disc 210 on to the sleeve 212 to prevent the communication of fluid from bore 180 to chamber 124.

The operation of the device described and illustrated in FIG. 2 is very similar to that illustrated in FIG. 1, the essential difference deriving from the novel design of the three-way valve. In the servomotor shown in FIG. 1 the valve design allowed a very short pedal stroke during the first phase of operation of the device, this stroke corresponding to the closure of the valve member 36 on the seat 34. Subsequently, once the pressure difference appeared, a reaction force exerted on piston 84 holds push rod 42 in position. In a servomotor design illustrated in FIG. 2 it is possible to obtain a predetermined pedal stroke throughout the first phase of servomotor operation, although the movement of the central piston 166 to the left in FIG. 2 is practically zero. This stroke is obtained by means of the spring 218 whose resilience is calculated to give the driver the reaction sensation desired by the designer of the vehicle. When push rod 142 is urged to the left in FIG. 2, the force applied by the operator is transmitted by the spring 218 to the sleeve 212 to operate the three-way valve 132. Although the central piston 166 does not move, the reaction force applies to the disc 210 leads to compression of the spring 218 and consequently to travel of the intake controlling push rod 142.

The servomotor shown in FIG. 3 also has a number of elements identical or similar to those already described with reference to the servomotor shown in FIG. 1. Therefore, these elements and their operation are not described in detail and bear the same reference numeral plus 300.

Although the first two servomotors, illustrated in FIGS. 1 and 2, operate correctly it may happen, especially if the hydraulic lines connecting the outlet orifices to the brake actuators are particularly long, that a pressure surge is established in the front compartment 58 and that the central piston makes fluid-tight contact with the sealing ring before the annular piston 64 has completed its normal stroke. In this case prefilling is not performed completely, and the pedal stroke is therefore increased during the second phase of operation. The same phenomenon may occur if the brake pedal is depressed very abruptly.

To prevent premature closure at the sealing ring 354, means 402 are associated with the central piston 366 for slowing its motion as follows. Control piston 366 contains a stepped bore having sections 404 and 406. The larger-diameter section 404 contains a core 408 fixed to the intake controlling elements 342 and bearing a rod 410, which slides in the bore 406. End of rod 410 projects through the sealing ring 354 into the compartment 358. The free end of the rod 410 has a step 412 which abuts a cup 414 retained in the free end of the central piston 366. Substantially all the cross-section of compartment 358 is swept by a structure including a plate 416. The plate 416 has a central aperture 418 which is urged in sealing abutment with cup 414 by a spring 420 attached to rod 410. Note also that the sealing ring 354 is fixed relative to the housing 344 by means of a sleeve 422 and a perforated disc 424. The sealing ring 354 has a lip and so forms a non-return valve between the compartments 356, 358. The sleeve 422 contains an aperture 425, so that when the pressure in the compartment 356 exceeds the pressure in the compartment 358 the lip at the edge of the ring 354 yields to allow fluid to flow between the two chambers.

Figure 3:
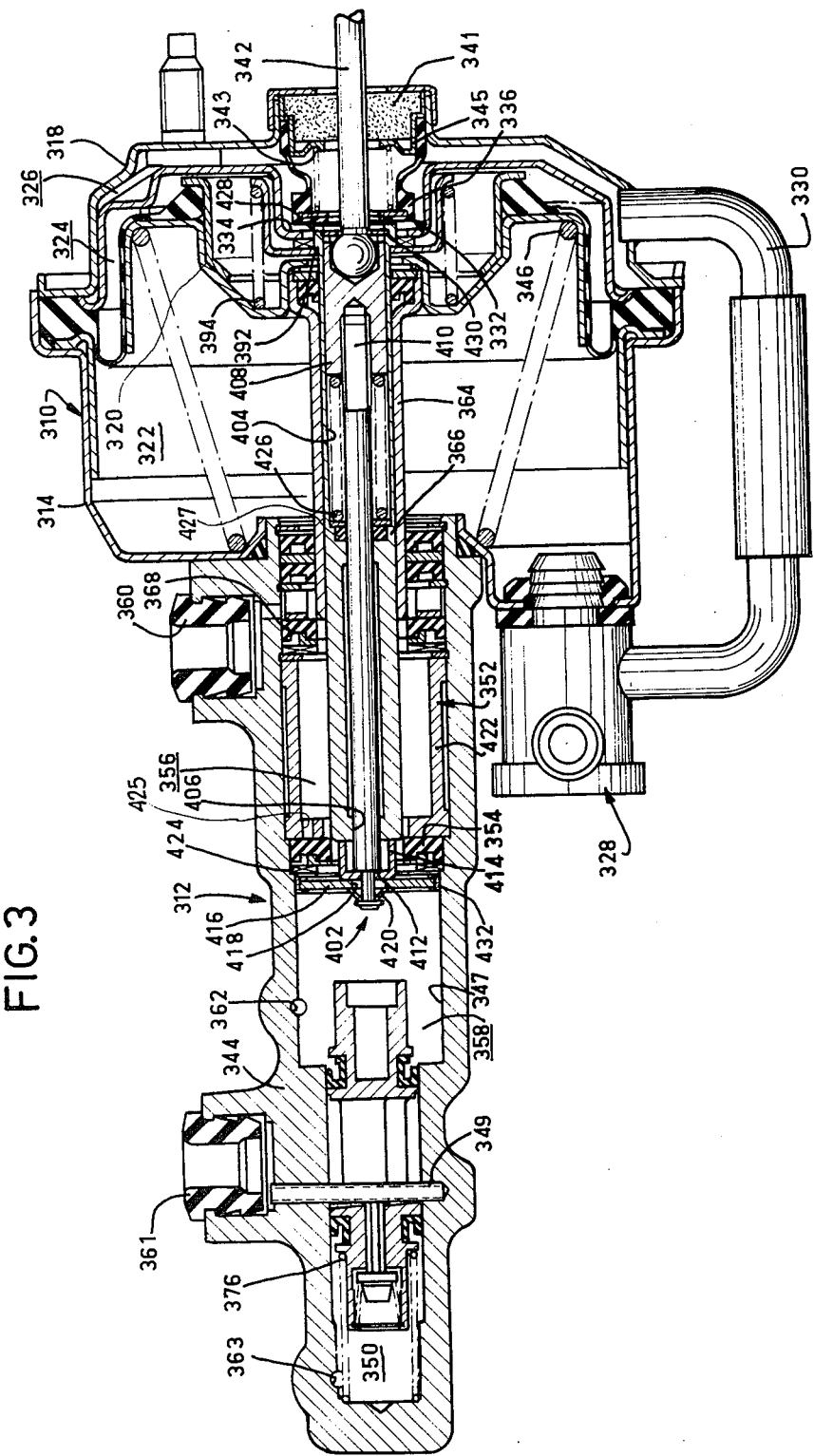
FIG. 3 illustrates a third servomotor for assisted operation, embodying the invention.

Another difference of the servomotor shown in FIG. 3 is that a calibrated spring 426 located in the bore 404 between the central piston 366 and the core 408 and the movable valve member 428 of the three-way valve 332 is mounted on the central piston. The core 408 is held in place in the bore 404 by the circlip 430. Lastly, the plate 416 contains a hole 432 of small cross-section, which may advantageously be replaced with a calibrated orifice within the scope of the invention.

The servomotor of FIG. 3 shows all the components of the servomotor in their idle positions. In the rest or idle position the three-way valve 332 is in a position such that the three chambers 322, 324 and 326 are connected to the negative-pressure source or vacuum.

When application of the brakes begins, an operator input force exerted on the rod 342 moves it and the plate 416 to the left in FIG. 3. Because the effective cross-section of the plate 416 as compared to the cross-section of the bore 347 in the compartment 358, the motion of the rod 342 is slowed if the brake pedal is depressed abruptly. When the rod 342 moves, the spring 426 is compressed and moves the central piston 366 to the left in FIG. 3 so that the valve member 336 can close on the seat 334. Atmospheric air is now admitted to the chamber 324, and the driving piston 320, accompanied by the annular piston 364, moves to the left in FIG. 3. After the compartment 356 has been isolated at the ring 368, the pressure in it rises and is communicated to the compartment 358. This results in a hydraulic reaction on the central piston 366, which is then transmitted by the spring 426 to the control or push rod 342. During the first phase of servomotor operation preceding saturation, therefore the ratio of the output pressure to the pedal stroke is a function of the rigidity of the spring 426 combined with the diameter of the central piston 366. These two parameters are at the discretion of the designer. On saturation, when atmospheric pressure prevails in the chamber 324, the increase in pressure is effected by way of the central piston 366.

If the brakes are applied slowly, the servomotor illustrated in FIG. 3 operates in a very similar manner to those already described, since the damper plate 416 has no appreciable effect. During slow applications, the hole 432 or a jet with a calibrated cross-section permits compensation of the variations in volume produced on either side of the plate. If, however, the brakes are applied rapidly or a pressure surge tends to arise in the front compartment 358 during the first phase of servomotor operation, the plate prevents premature depression of the pedal by retarding the movement of the central piston 366. The plate 416 makes it possible to prefill the brake receiving cylinders. When the brakes are released, the plate 416 moves away from the cup 414 and allows fluid to flow freely through the plate by way of the aperture 418.

As indicated above, the plate 416 and the associated structure comprising the rod 410 and springs 426 and 420 define the means 402 for slowing the motion of the central piston 366 during the first phase of servomotor operation.

In a variant of the embodiment illustrated in FIG. 3, the seal 427 which isolates the chamber 404 from the front compartment 358 is withdrawn and placed on the core 408, betwenn the latter and the piston 366. In this case a large part of the hydraulic reaction is applied directly to the core 408, through chamber 404 communicating with the front compartment 358 by way of an appropriate duct. Here the sole function of the spring 426 is to restore to the pedal the force generated by the hydraulic pressure on the annular section of the central 366, level with the valve member 408.

Compared with the previous servomotor, this variant provides a damping effect on the valve member 428 by means of the hydraulic fluid contained in the chamber 404, and an increase in the volumetric capacities of the device owing to the fact that the movement of the core 408 in the chamber 404 is utilized to expel fluid to the receiving cylinders.

What we claim is:

1. A servomotor for assisting operation of a brake system comprising: a housing;
a power-assisting part in said housing having a driving piston located therein;
a part forming a hydraulic master-cylinder;
said power-assisting part cooperating with an external power source to generate a pressure difference across the driving piston;

a first valve means operated by an intake controlling element for controlling the generation of said pressure difference;

said master-cylinder part having a chamber communicating with a fluid replenishing orifice and an outlet orifice;

an assembly of two coaxial pistons including an annular piston attached to the driving piston and a central piston movable solely by way of the intake controlling element;

said first valve means when actuated out of their idle position causing the driving and annular pistons to move in unison during a first phase of servomotor operation so as to disconnect the replenishing orifice from the chamber and to generate a first pressure level in the chamber;

means for dividing said chamber into two compartments, a first of said two compartments adjoining the outlet orifice and a second of said two compartments receiving said annular piston during a second phase of servomotor operation when said central piston is moved out of its idle position for a predetermined travel to increase the pressure level in the first compartment by means of a manual force exerted by the operator; and means for slowing the motion of the central piston during the first phase of servomotor operation including a rod having a first end attached to the intake controlling element, said rod being slidable in a longitudinal bore provided in said central piston and projecting into the first compartment, said means having a compression spring located between the intake controlling element and the central piston, said rod having a second end bearing a damper plate structure, said damper plate structure sweeping substantially all the effective cross-section of the first compartment during the first phase of servomotor operation.

2. A servomotor as claimed in claim 1, wherein the damper plate structure is associated with a valve device to open a fluid passage through the plate structure during the return stroke of central piston towards its idle position.

3. A servomotor as claimed in claim 2, wherein the damper plate structure and the valve device comprise a spring biased plate having a central aperture adapted to be covered by a cup mounted on the other end of the rod.

4. A servomotor as claimed in claim 1, wherein the central piston is provided with a cylindrical cavity containing the compression spring and slidably receiving a core attached to both the intake controlling element and the rod.

5. A servomotor as claimed in claim 1, further comprising a seal between the central piston and the rod to isolate the cylindrical cavity from the first compartment.

6. A servomotor as claimed in claim 1, wherein the central piston is attached to a movable valve member belonging to the first valve means.

* * * * *